April 9, 1940.                M. L. ECKMAN                2,196,523
                             WELDING APPARATUS
                            Filed June 9, 1937          3 Sheets-Sheet 2
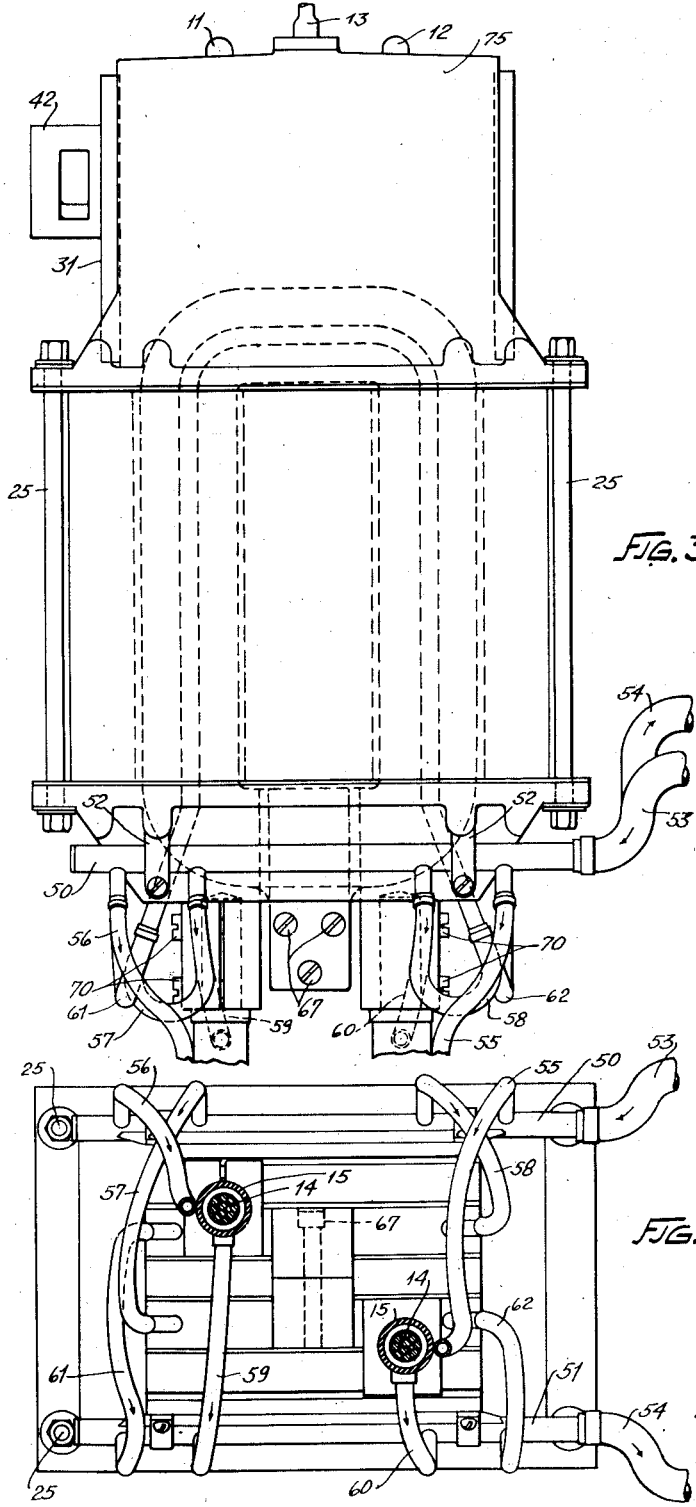
INVENTOR.
Meril L. Eckman
Bates, Golrick & Teare
ATTORNEYS.

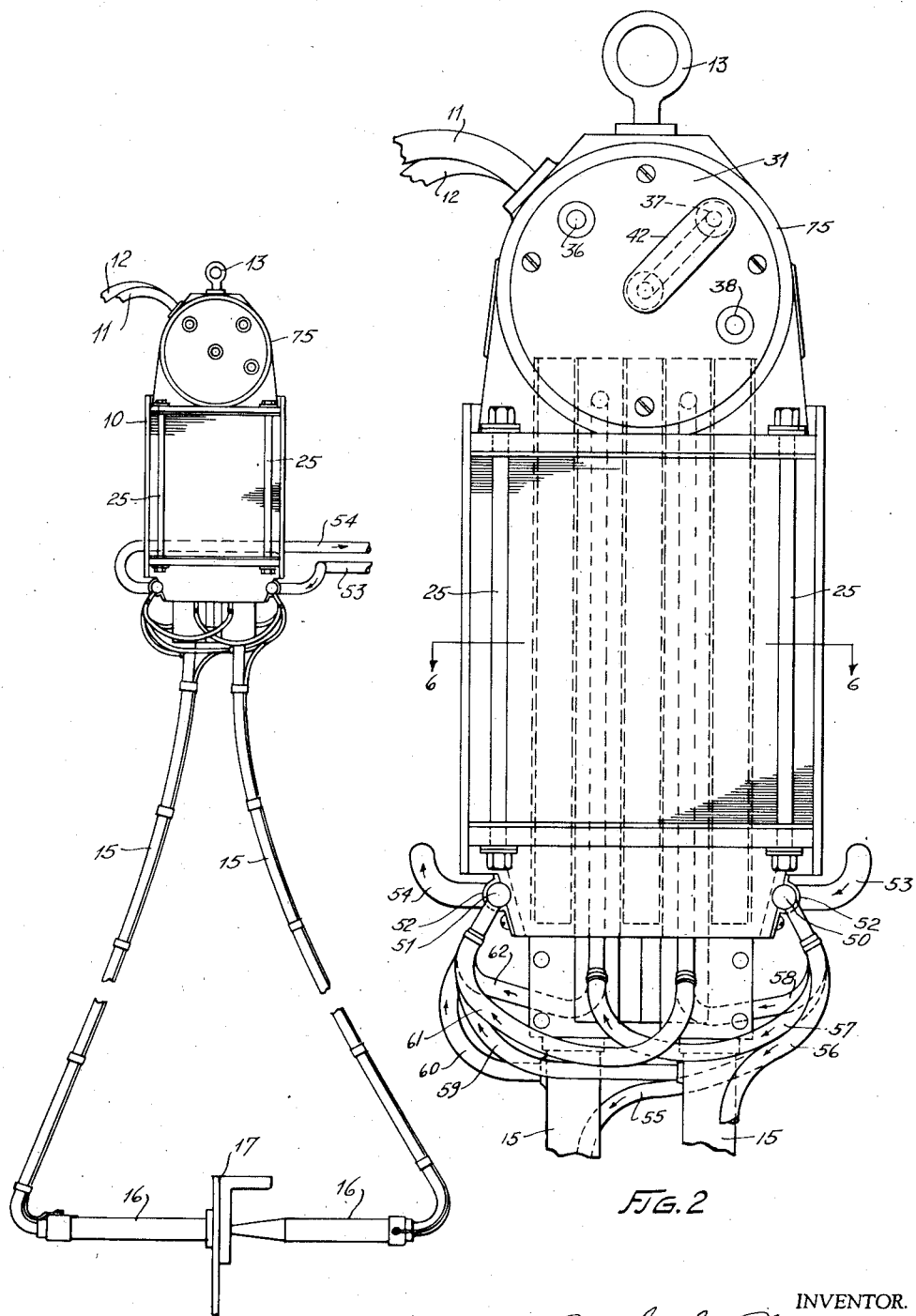

April 9, 1940.    M. L. ECKMAN    2,196,523
WELDING APPARATUS
Filed June 9, 1937    3 Sheets—Sheet 3
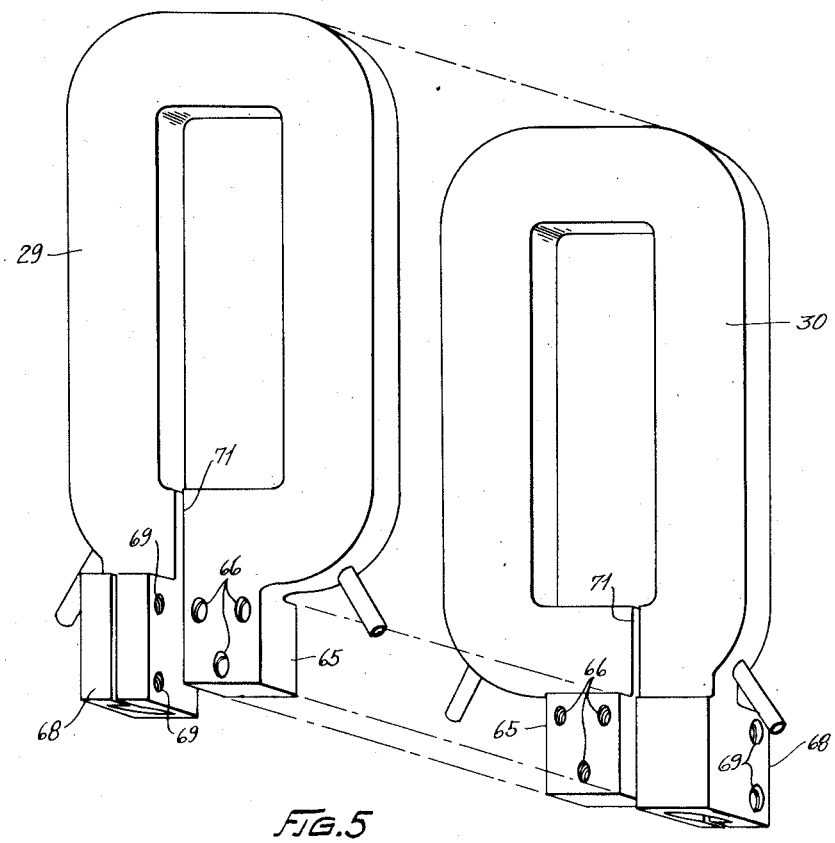
Fig. 5
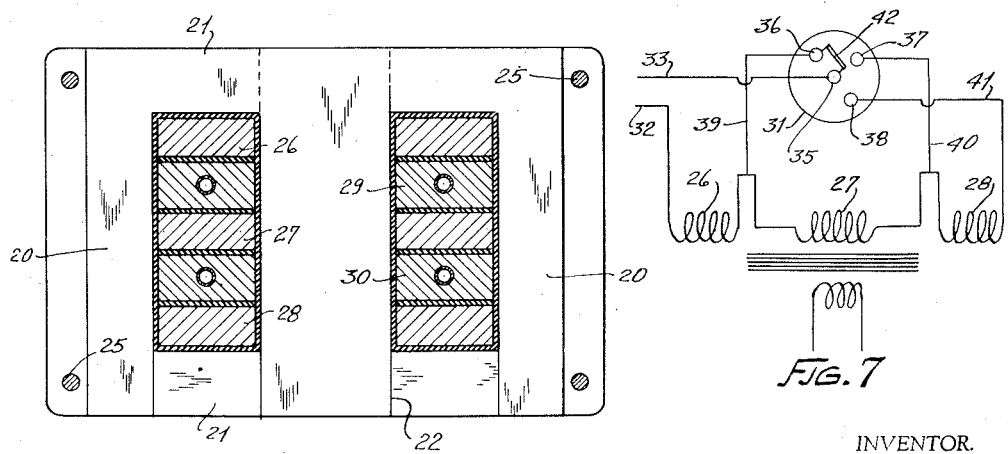
Fig. 6
Fig. 7
INVENTOR.
Meril L. Eckman
BY Bates, Goldrick & Teare
ATTORNEYS.

Patented Apr. 9, 1940

2,196,523

UNITED STATES PATENT OFFICE 2,196,523

WELDING APPARATUS

Meril L. Eckman, Cleveland, Ohio, assignor to The American Coach and Body Company, Cleveland, Ohio, a corporation of Ohio Application June 9, 1937, Serial No. 147,242

6 Claims. (Cl. 171—119)

This invention relates to transformers and particularly to those which are adapted for use in connection with portable spot welding apparatus. One of the difficulties, which has been experienced in connection with the operation of spot welding equipment has been the construction of a transformer, which will not overheat and which is capable of being quickly adjusted to suit varying conditions of current demand. This has been particularly noticeable in welding equipment, which utilizes long flexible current conductors, each of which is movable independently of the other, and each of which is provided with an electrode that may be held by an operator and pressed against the work by the exertion of force in an endwise direction upon the electrode.

An object of my invention is to make a transformer, which is readily adapted to supply current in accordance with the varying requirements of the work to be welded. An additional object is to make a construction which will facilitate the cooling, not only of the transformer, but also of the flexible conductors, which extend from the secondary thereof.

Referring now to the drawings, Fig. 1 is a side elevation of a welding unit having a transformer embodying my invention; Fig. 2 is a side view of the transformer shown on a scale larger than that illustrated in Fig. 1; Fig. 3 is a front view of the transformer shown in Fig. 2; Fig. 4 is a bottom view of the transformer shown in Fig. 2 and illustrating the flexible conductors in cross-section; Fig. 5 is an exploded perspective view of the secondary coil, which is adapted to be used in my transformer construction; Fig. 6 is a section taken on the line 6—6 of Fig. 2, and Fig. 7 is a wiring diagram.

As applied to a portable welding device, my transformer may be indicated at 10, as having current supply conductors 11 and 12 leading thereto and as having an eye 13 for supporting it in an overhead position. Suitable current carrying conductors 14 encased within conduits 15 of insulating material extend downwardly from the secondary of the transformer, and are each connected to an electrode 16, which may be held against the work 17 by an operator.

The transformer is illustrated as comprising a closed magnetic shell, having outer legs 20, and legs 21 and a central leg 22, which is composed of laminations that are bound together by bolts 25. Surrounding the central leg and enclosed within the shell are primary coils 26, 27 and 28, and secondary coils 29 and 30. The primary coils are adapted to be connected in series, through a selective terminal block 31 by means of which the transformer may be operated by one or more primary coils. The secondary coils are mechanically and electrically interconnected and each comprises a single turn casting. The secondary coils are arranged upon the center leg in alternation with the primary coils, and hence there is a primary coil on each side of each secondary. Each coil, however, is suitably insulated from the adjacent coil.

In Fig. 7, I have shown a wiring diagram wherein the source of current supply is indicated by the conductors 32 and 33 and wherein the primary coils are indicated at 26, 27 and 28 respectively. In this diagram, the terminal block 10 is shown as having a central outlet 35 and peripheral outlets 36, 37 and 38 respectively; the peripheral outlets being respectively connected to one end of the coils 26, 27 and 28 respectively, by conductors 39, 40 and 41 respectively. A manually operable selective bridge piece 42 is adapted to bridge the gap between the central outlet and any one of the peripheral outlets and to conduct current therebetween. Thus, when the bridge piece occupies the outlets 35 and 36, the coil 26 of the transformer is adapted to carry current, but whenever the member 42 bridges the gap between the outlets 35 and 37, then the coils 26 and 27 are carrying current, whereas whenever the piece 42 bridges the gap between the outlets 35 and 38, then all primary coils are connected in series and are adapted to carry current. Thus, the flow of current in the primary of the transformer may be varied to suit the current requirements of the secondary for any particular welding operation.

To prevent overheating of the transformer and also of the flexible conductors 14, I provide a cooling medium such as a stream of cool water, which flows through the secondary turns of the transformer and which flows between the conductors 14 and the casings 15 therefor.

To facilitate the inlet and outlet of the water, I provide an inlet header 50 and an outlet header 51, each of which is supported by brackets 52. Water may be conducted to the header 50 by a supply conduit 53 and may be conducted from the header 51 by a discharge conduit 54. Suitable branch conduits extend from the inlet header to the electrodes as at 55 and 56 respectively and to the secondary turns as at 57 and 58. The branch conduits 55 and 56 preferably extend down the outer sides of the flexible casings 15 so that the fluid flows through and around the electrodes in its coldest condition. It then flows upwardly within the casings 15, and thence out through branch conduits 59 and 60 to the outlet header 51. Similarly, the cooling fluid after passing through the secondary coils is discharged into the header 51 through branch conduits 61 and 62. In this way, each secondary turn and each electrode receives the cooling fluid in its coldest condition, wherefore the transformer may be maintained at the desired degree of temperature in a most effective manner.

To connect the secondary turns together electrically, and at the same time to hold them in spaced relationship for receiving the primary coil 27 therebetween, each secondary turn has an inwardly projecting lug 65 with bolt passages 66 extending therethrough. Each lug extends laterally from the turn approximately half the distance of the desired space in between the turns, so that when the fastening bolts 67 are tightened, the secondary turns are positioned in their proper position within the magnetic shell.

Additionally, each turn has a lug 68 projecting laterally therefrom for receiving a terminal of the connector 14, and each lug 68 may be provided with bolt passageways 69 for receiving bolts 70 which operate when tightened to clamp the lugs about the terminals. To assure two complete turns of the secondary and yet to permit each turn to be made in a single casting, a slit is made in each therethrough, as at 71, and the space is then filled with electrical insulating material, preferably in the form of mica sheets.

To facilitate the application of current, a circuit controller in the form of a push-button switch is mounted on one of the electrodes for the convenience of the operator, but such controller is not illustrated in the drawings, as its construction forms no part of the present invention.

The selectively operable bridge piece 42 preferably comprises a casing of electrical insulating material, which houses a conductor, the ends of which terminate in plugs that are insertable in the outlets 35, 36, 37 and 38 respectively. The terminals of the various primary coils are electrically connected to the outlets, as specified in connection with the wiring diagram appearing in Fig. 7 and such terminals are encased within a housing 75, which surmounts the magnetic core and which is clamped thereto by the bolts 25. Thus, the connections are adequately concealed and protected against damage.

A transformer that is made in accordance with my invention is advantageous in that the current supplied to the primary may be selectively predetermined in accordance with the size of the metal to be welded. The adjustability may be readily and accurately accomplished, and thereafter the welding may be performed in the usual way. A further advantage is the fact that all of the parts which are apt to be heated during use may be kept effectively cool in a simple and an expeditious manner.

I claim:

1. A transformer comprising a closed magnetic core having a central leg, a plurality of primary coils on the central leg, a two turn secondary, the turns being connected in series and each being disposed between two primary coils, a source of current supply, means for selectively connecting one or more of the primary coils in circuit with the source of supply, a source of cooling fluid, an inlet and a discharge header carried by the transformer, a flexible current conductor connected to each turn of the secondary, branch conduits leading from the inlet header to each secondary turn and to each flexible conductor, and other branch conduits leading from each secondary turn and from each flexible conductor to the discharge header.

2. A transformer comprising in combination, a closed magnetic core, a primary coil and a secondary coil disposed on the core, flexible conductors attached to the secondary coil, means enclosing the conductors for conveying cooling fluid therearound, inlet and discharge headers attached to the core, and having branch conduits extending to the secondary and other branch conduits extending to the conductors.

3. In a portable welding apparatus the combination of a transformer having a hollow secondary to which a flexible current carrying conductor is electrically connected, a cooling system for the secondary and conductor, comprising: an inlet header, a discharge header, a conduit leading from the inlet header to the secondary, and from the secondary to the discharge header, and a second conduit leading from the inlet header to the conductor and from the conductor to the discharge header, whereby the secondary and conductor are effectively cooled, independently of one another.

4. In portable welding apparatus, the combination of a transformer having a hollow two-turn secondary, the turns of which are separate castings, a pair of flexible conductors connected to the turns of the secondary, inlet and discharge cooling fluid headers, conduits leading from the turns respectively of the secondary to the inlet and discharge headers respectively, other conduits leading from the conductors to the inlet and discharge headers, respectively, and a source of fluid supply connected with the inlet header whereby the cooling of the secondary turns takes place independently of the cooling of the conductors.

5. In a portable welding apparatus for supplying a welding current to suitable electrodes, the combination of a transformer having a closed magnetic core, three primary coils, and a secondary coil mounted on the core, the secondary coil comprising two separate hollow turns adapted to receive a cooling fluid therein, a flexible conductor for each secondary turn, a source of current supply for the primary coils, a pair of flexible conductors connected to the secondary coil, electrical means for conducting said source of current through one or more of said primary coils to decrease or increase the current supplied to said electrodes, and a cooling system for the secondary coils and conductors comprising inlet and discharge headers, a conduit extending from the inlet header through one of the secondary coils and thence to the discharge header and other conduits extending from the inlet header to the electrodes and thence to the discharge header.

6. In portable welding apparatus, the combination of a transformer having a hollow two-turn secondary to which a pair of flexible conductors are electrically connected, inlet and discharge headers for conveying cooling fluid, means for conducting fluid from the inlet header through the secondary and to the discharge header, other means for conducting fluid from the inlet header through the flexible conductors to the discharge header, a source of current supply, and electrical means for increasing and decreasing the amount of current supplied to said conductors from said source.

MERIL L. ECKMAN.